United States Patent [19]

Chang

[11] Patent Number: 5,022,157
[45] Date of Patent: Jun. 11, 1991

[54] TRANSMISSION MECHANISM FOR SCROLL SAWING MACHINE

[76] Inventor: Andy Chang, No. 38, Juan Liau Rd., Fong Yuan, Taichung, Taiwan

[21] Appl. No.: 559,312

[22] Filed: Jul. 30, 1990

[51] Int. Cl.⁵ ............................................. B23D 49/04
[52] U.S. Cl. ......................................... 30/394; 74/45; 74/47
[58] Field of Search ................................. 30/392–394, 30/500; 73/42, 45, 47, 61

[56] References Cited

U.S. PATENT DOCUMENTS

| | | | |
|---|---|---|---|
| 2,639,737 | 5/1953 | Forsberg | 30/392 |
| 2,746,493 | 5/1956 | Babcock | 30/394 |
| 3,457,796 | 7/1969 | Leach et al. | 30/393 X |

*Primary Examiner*—Douglas D. Watts
*Attorney, Agent, or Firm*—Bucknam and Archer

[57] ABSTRACT

A transmission mechanism for a scroll sawing machine is disclosed. An upper counter weight and a horizontal counter weight are secured to the lower end of a rocker arm, which has its top end secured to the scroll saw blade upper driving arm, and carried to move by the transmission shaft of a motor. The rotation of the transmission shaft of the motor drives the upper counter weight to rotate so as to eliminate any possible vertical shock waves, and simultaneously drives the rocker arm to move up and down so as to eliminate any possible horizontal shock waves.

1 Claim, 2 Drawing Sheets

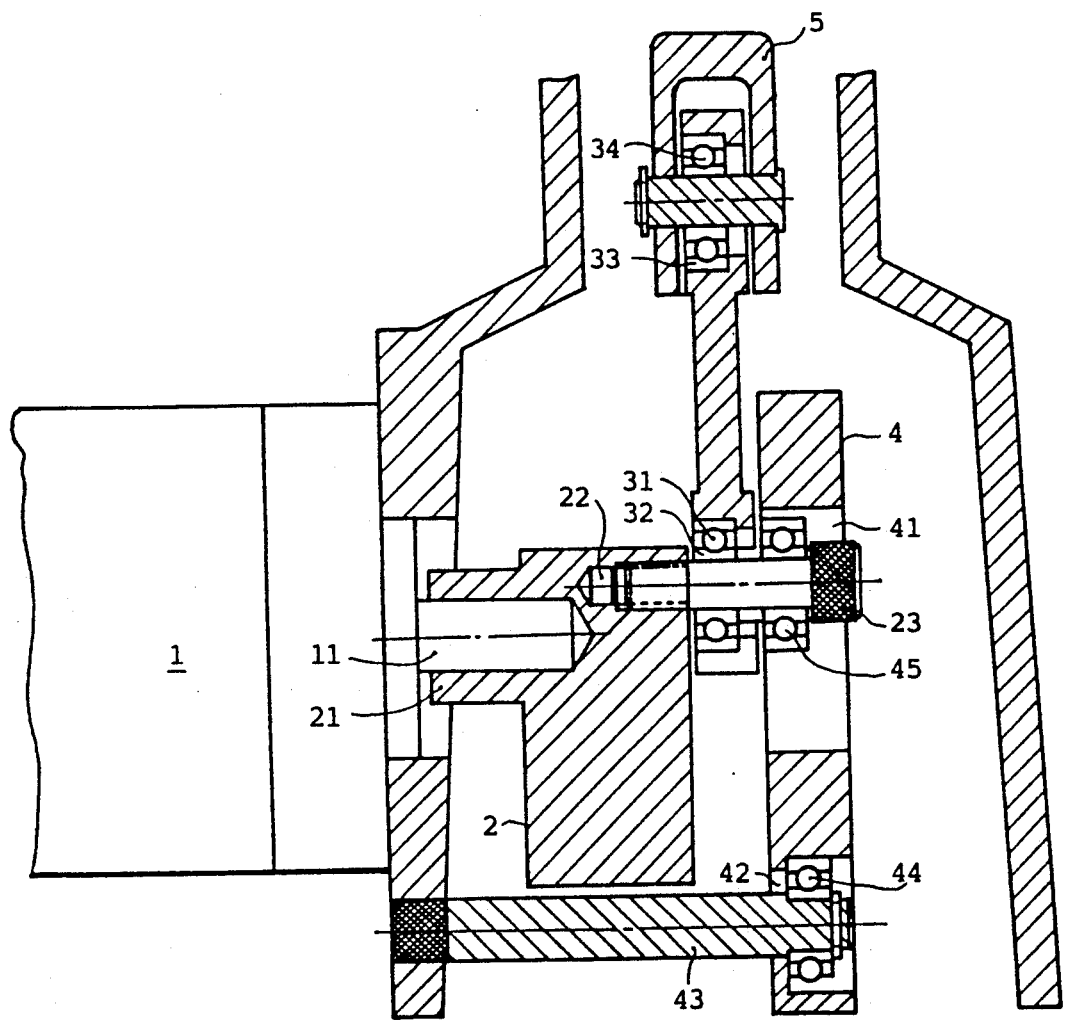
FIG:2

TRANSMISSION MECHANISM FOR SCROLL SAWING MACHINE

BACKGROUND OF THE INVENTION

The present invention is related to transmission mechanisms and more particularly to a transmission mechanism for scroll sawing machine which can effectively eliminate any possible shock waves horizontally as well as vertically.

Scroll sawing machine generally comprises two suspension arms driven by a transmission mechanism to carry a thin, ribbonlike saw blade for cutting thin wood or other material into spiral or ornamental designs. A transmission mechanism for a scroll sawing machine according to the prior art generally comprises a motor to carry two opposite suspension arms of a scroll sawing machine to make reciprocating motion via a cam wheel so as to carry a scroll saw blade to perform cutting operation. Because the moving direction of the transmission shaft of the motor is vertical to that of the two opposite suspension arms, the machine table will vibrate more or less, to unfavorably affect the operation.

SUMMARY OF THE INVENTION

The present invention has been accomplished under the circumstances in view. It is the main object of the present invention to provide a transmission mechanism for a scroll sawing machine, which can effectively eliminate any possible shock waves arisen from cutting operation of the scroll saw blade of a scroll sawing machine so as to extend the service like of the scroll blade.

BRIEF DESCRIPTION OF THE DRAWINGS

The present invention will now be described by way of example with reference to the annexed drawings, in which:

FIG. 2 is a schematic front view thereof.

DETAILED DESCRIPTION OF THE PREFERRED EMBODIMENT

Figure 1:
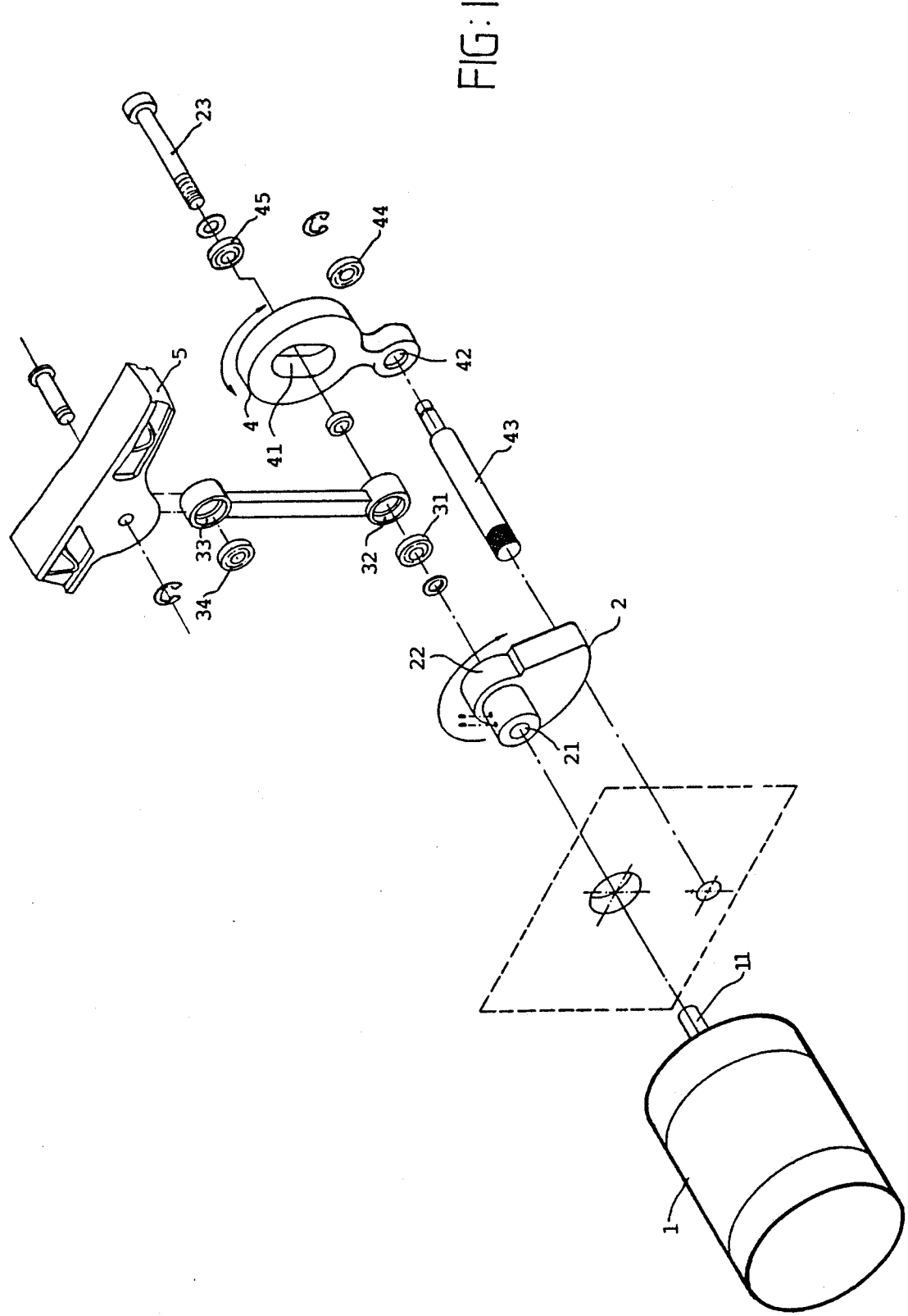
FIG. 1 is a perspective exploded view of the present invention.

Referring to the annexed drawings in greater detail, therein illustrated is a transmission mechanism for a scroll sawing machine according to the present invention and generally comprised of a motor 1, an upper counter weight 2, a rocker arm 3, a horizontal counter weight 4 and a swing arm 5.

As illustrated, a transmission shaft 11 extend from the motor 1 at the center thereof and is fastened in a seat portion 21 made on the upper counter weight 2. The upper counter weight 2 is formed in a substantially sector block having a seat portion 21 projection therefrom at one side for fastening the transmission shaft 11 and an eccentric hole 22 at an opposite side for fastening a lock bolt 23. The rocker arm 3 is an elongated element having two mounting holes 32, 33 at two opposite ends thereof. A bearing 31 and a washer are attached to the lower mounting hole 32 by the lock bolt 23. Another bearing 34 is attached to the upper mounting hole 32 and secured to the rotary arm 5.

The horizontal counter weight 4 is formed of two sector blocks in different size, in which the upper sector block is relatively bigger in size and has a hole 41 thereon for fastening the lock bolt 23, the lower sector block is relatively smaller in size and has a hole 42 thereon for mounting a bearing 44 and a fastening bolt 43 to secure inside machine table. There is still a bearing 45 mounted on the lock bolt 23 permitting the lock bolt 23 to smoothly rotate in the hole 41.

The swing arm 5 is the upper arm of a scroll sawing machine and firmly coupled with the rocker arm 3 to carry a scroll saw blade to operate.

The operation of the present invention is outlined hereinafter with reference to FIG. 2. As soon as the motor 1 starts to operate, the transmission shaft 11 drives the upper counter weight 2 to rotate eccentrically and simultaneously drives the rocker arm 3 to rotate so as to carry the swing arm 5 to move up and down in carrying a scroll saw blade for cutting. Since the upper counter weight 2 is driven to move in a rotary motion, it greatly eliminates any possible vertical shock waves. Through the eccentric motion of the lock bolt 23 inside the hole on the upper sector block of the horizontal counter weight 4 and the arrangement of fixing the hole on the lower sector block of the horizontal counter weight 4 by the fastening bolt 43, the horizontal counter weight 4 is permitted to rotate leftwards and rightwards within a narrow range so as to eliminate horizontal shock waves.

As described above, a transmission mechanism for a scroll sawing machine according to the present invention can effectively eliminate vertical as well as horizontal shock waves arisen from cutting operation of a scroll saw blade so as to extend the service life of a scroll saw blade.

It is apparent that various modification could be made to the present invention without departing from the basic teachings thereof. Recognizing that various modification been apparent, the scope herein shall be deemed as defined in the claims set forth hereinafter.

What is claimed is:

1. A transmission mechanism for a scroll sawing machine, comprising:

a motor having a transmission shaft;

a substantially sector-shaped upper counter weight having a seat portion projection therefrom at one side for fastening said transmission shaft and an eccentric hole at an opposite side;

a rocker arm being an elongated element having an upper mounting hole at one end and a lower mounting hole at an opposite end;

a horizontal counter weight formed of a relatively bigger upper sector block portion with a hole thereon and a relatively smaller lower sector block portion with a hole thereon for the insertion therethrough to secure said horizontal counter weight to a machine table;

a lock bolt inserted through the hole on said upper sector block portion of said horizontal counter weight and said lower mounting hole of said rocker arm and fastened in said eccentric hole of said upper counter weight;

a swing arm coupled with said upper mounting hole of said rocker arm to carry a scroll saw blade to operate;

characterized in that the rotation of said transmission shaft of said motor drives said upper counter weight to rotate and said rocker arm and swing arm to move up and down so as to eliminate any possible vertical and horizontal shock waves.

* * * * *